July 14, 1970        A. W. KURZ, JR        3,520,594
PRISMATIC REAR VIEW MIRROR
Filed Dec. 13, 1967
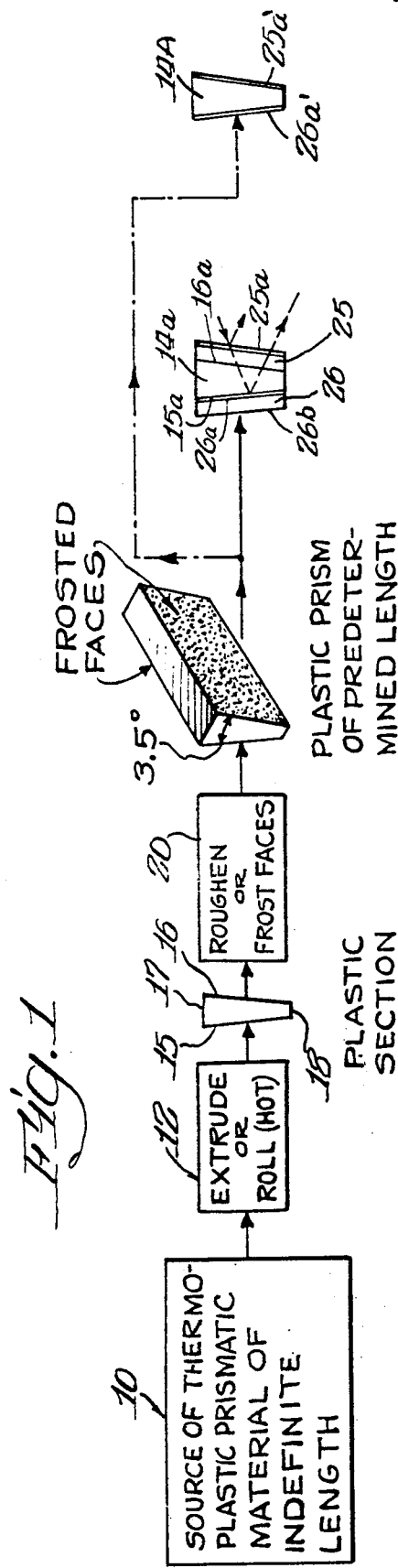
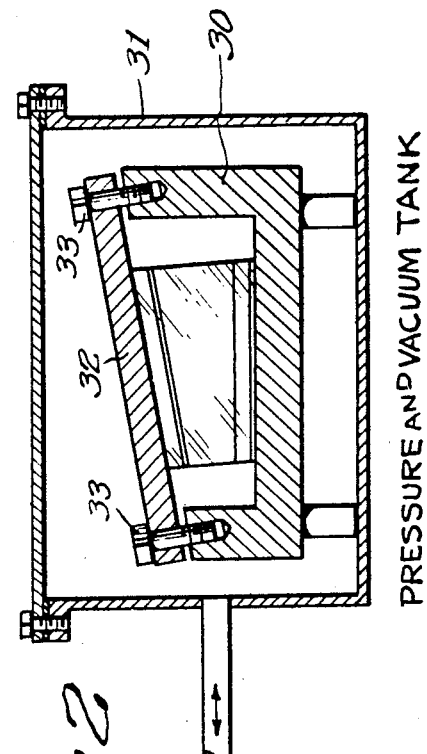
Inventor:
Arthur W. Kurz, Jr.
BY Max R. Kraus
ATTY.

United States Patent Office 3,520,594
Patented July 14, 1970

3,520,594
PRISMATIC REAR VIEW MIRROR
Arthur W. Kurz, Jr., Birmingham, Mich., assignor to Nelmor Corporation, Harper Woods, Mich., a corporation of Illinois
Filed Dec. 13, 1967, Ser. No. 690,260
Int. Cl. G02b 17/00
U.S. Cl. 350—281        6 Claims

ABSTRACT OF THE DISCLOSURE

The invention relates to a prismatic mirror having planar nonparallel optical surfaces between which is a prismatic shaped body of thermoplastic material. The prismatic plastic material is transparent to any desired degree and has its two major faces roughened or frosted. A reflecting surface is provided at the rear prism face and a surface having both reflecting and light transmitting characteristics is provided at or adjacent the front prism face. The optical surfaces may be part of the prism structure or may be part of ordinary glass support means of a laminated mirror structure.

---

This invention relates to a prismatic mirror structure and method of making the same and is particularly concerned with a mirror structure having substantial differences in coefficients of reflection depending upon which one, of two different images, is viewed. While not limited thereto, the invention is particularly useful for rear view mirrors for vehicles. In such rear view mirrors it is customary to have a substantially bright image for daylight use and to have a subdued image for night conditions. Such differential effects are obtained by having two planar optical surfaces in nonparallel relationship. The front optical surface (with reference to the incident beam of light) is sufficiently transparent so that, in addition to providing a night reflecting image, incident light may also pass through such front optical surface and fall upon a rear optical surface. Due to the nonparallel relationship between the two optical surfaces, the paths of reflected light for a coincident beam falling upon the mirror structure will be different. Consequently, by adjusting the viewing angle, a reflected image from the front or rear optical surfaces may be selectively viewed.

Rear view mirrors utilizing the above optical principles are in wide use. Such mirrors conventionally have a glass prism and, while generally satisfactory in operation, have some serious drawbacks not only with respect to cost of manufacture but also potential danger in case of accident.

Insofar as manufacturing such mirrors is concerned, conventional techniques rely upon grinding a glass blank to obtain a satisfactory prism. The prism and cooperating members carrying optical surfaces, are mounted in a mechanism permitting mirror movement over a predetermined angle to select day or night operation. Different vehicle manufacturers may require different prism angles and thus call for different grinding procedures. The actual magnitudes of prism angles is quite small and will usually lie in the range of about 2° to about 10°. The art has generally used prisms having about 3 or 3½ degrees. The grinding of glass to precise prism angles is costly and time consuming.

A mirror having a prismatic glass base ranging from relatively thick material at one long edge to relatively thin material at the other long edge represents a potential danger in case of collision. As is well known, such rear view mirrors are usually located somewhat to the front of and near the top of a driver's head. In case of accident, such a mirror may splinter and inflict dangerous or fatal wounds.

Making an optical prism by casting plastic material is impractical. The cost of making such a mirror with good optical surfaces is high. The optical properties of a mirror structure having a cast plastic prism are not satisfactory. A serious problem of obtaining strong adhesion between the cast plastic and optically active material for defining optical surfaces is present. Thus a mirror having glass plates provided optically active surfaces when joined to a cast plastic prism does not provide a strong structure which can withstand mechanical shock and which can easily be sealed against entry of moisture, air and the like.

I have discovered that a highly efficient and desirable mirror construction may be obtained by utilizing suitable thermoplastic material having a longitudinally oriented molecular structure (obtained by extruding or rolling while hot) and roughening the faces of such plastic prior to the application thereto of optically active material. The optically active material or surface may be carried by the roughened plastic surfaces or may be carried by separate glass plates of uniform thickness, such glass plates and plastic prism being assembled and hot pressed under suitable conditions to remove entrapped air, moisture and provide a strong laminated unitary structure.

The resulting mirror construction set forth above is as good and efficient as any prior prismatic mirror structure and makes it possible to manufacture the same at lower cost than prior structures. The new mirror structure has the safety feature of being nonshatterable. Full and complete control over the reflection characteristics and transparency characteristics of the optical surfaces and plastic prism is present to as great a degree as any prior construction. The roughening of the plastic prism surfaces has no objectionable effect upon the optical characteristics of the entire mirror. The roughening of the plastic material not only increases the surface contact to improve adhesion but also minimizes air entrapment by allowing air to escape via the microscopic grooves. The image reflected from the rear active optical surface of the new mirror is substantially free from visible distortion which might be expected from the roughened plastic surfaces. As a result of the invention, conventional glass having a uniform thickness and easily obtained plastic prisms in any desired lengths not only reduce the costs of tooling in connection with manufacturing but, in addition, speed up the assembly of components into a unitary structure.

For a full description of the invention reference will now be made to the drawings wherein:

FIG. 1 is a flow sheet illustrating the method of making the new mirror, this figure also showing a section of a mirror assembly and a dotted flow line going to a section of a modified mirror assembly.

FIG. 2 is a diagrammatic view of an assembly in a clamp, all in a pressure tank.

Referring now to FIG. 1, 10 is a source of suitable thermoplastic material such as polyvinyl butyral. This material is particularly desirable for the reasons that is has acceptable optical properties, is readily available at reasonable price and bonds to glass. Plastic source 10 feeds means 12 to generate a continuous strip of plastic having a wedge or prismatic transverse section. Such a strip may be obtained by forcing hot, amorphous plastic through an extrusion die. An alternative procedure has hot plastic run between nonparallel hot rollers. Extrusion is preferred because the shape and transverse dimensions of the plastic prism may be accurately controlled. The thermoplastic material at the output of block 12 is in the shape of an endless strip of plastic having wedge shaped section 14. The strip has planar faces 15 and 16 extending along the length thereof and relatively wide side 17 and narrow side 18. The distance between sides 17 and 18 for most automobile mirrors will be about 2 or 2½ inches. However, this width is exemplary and any other desired dimension can be assumed.

Faces 15 and 16 of the prism section are planar and are nonparallel. The angle between faces 15 and 16 may be anywhere from about 2° to about 10°. It is understood that the angle is measured from the intersection of planes 15 and 16 and will be the angle subtended by sides 17 and 18. This angle comes into play in connection with the mechanical mirror mounting means for permitting mirror movement to shift the viewing angle for day or night use. As is well known, the mirror movement is about an axis parallel to the mirror length (perpendicular to the plane of a wedge section).

The plastic prism blank is now treated to create a frosted or roughened effect on faces 15 and 16. The roughening may be effected by mechanical means such as by scarification between roughened steel rollers having fine microscopic projections. Other means for effecting frosting may be used. Frosting procedures are well known in connection with providing a surface on plastic tape which will take pencil writing.

Chemical frosting may also be utilized. Block 20 in the flow diagram indicates the frosting phase. Either before or after frosting, plastic prism blank 14 is cut into suitable lengths. Thus the blank may be cut into 5 foot lengths (the exact figure is unimportant and will depend upon final individual mirror lengths). A plastic strip will generally have a thickness at side 17 of about ⅛ inch and a correspondingly reduced thickness at side 18. As a rule, side 18 of the prism strip should not be thinner than about .015" to avoid die problems and avoid too feathery an edge. The frosted effect may also be accomplished during extrusion by having fine projecting regions in the die surfaces.

Plastic wedge shaped blank 14 after having been cut to desired lengths and shapes (corners may be rounded) can be used in connection with making a mirror assembly. Individual plastic wedge length 14a may have disposed against its front face 16a a conventional piece of glass 25 applied thereto. Glass piece 25 may be of any type of glass and will have uniform thickness. Glass 25 preferably has its shape conforming to the plastic prism and is washed clean and dried. Glass piece 25 may have front face 25a, upon which incident light will fall during normal mirror use, either untreated or provided with a suitable optical surface coating having predetermined light reflection and light transmission characteristics.

As is well known, glass 25 without any surface treatment normally has a reflection coefficient of about 4.5%. By having thin coatings of various metallic surfaces, the reflection characteristic of outer surface layer 25a may be increased to any desired value. As a rule, a reflection characteristic of the general order of from 10% to 30% appears to be desirable. By having the optical layer thin enough, light transmission characteristics of between about 90% and about 70% (depending upon the amount of light reflected by layer 25a) will be available for passage through the plastic wedge. As an example, surface 25a may have applied thereto a chrome layer of film of suitable thickness. Such films are well known for use in rear view mirrors and are obtained by various means such as, for example, thermal evaporation or sputtering in a vacuum. Other metals for mirror surfaces may also be used, the degree of reflection and the degree of light transmission to such films being steadily controllable by well known techniques.

The plastic prism material, in this instance polyvinyl butyral, is transparent. However, the transparency need not necessarily be as good as clear glass since the amount of light reflected from the back mirror surface to be described is not 100%. Thus, as a rule, the rear reflecting surface may have reflection coefficients of about 50% or over depending upon customer requirements.

Referring now to rear plastic surface 15a, rear reflecting member 26 may be similar to glass 25 insofar as shape and uniform thickness are concerned. However, glass 26 will carry reflecting means 26a at the face adjacent to plastic rear face 15a. Glass 26 may have reflecting means on either face of the glass member depending upon the nature of the reflecting means. Where a silver mirror reflecting surface is to be used (obtained in conventional fashion) it is desirable to have the reflecting surface at face 26b, this being the outer rear face of glass 26. It is understood that the silver reflecting surface will itself be protected by conventional tough coating used in mirrors to prevent damage or scratching of the reflecting film. It is also possible to use aluminum coating on the front surface of glass 26 adjacent rear face 15a of a plastic prism. An aluminum coating when properly applied can reflect as much as 85%. Other mirror surfaces on either side of glass 26 may be used to provide a desirable rear mirror surface for reflecting light passing through the front mirror and plastic prism 14a.

The various glass plates 25 and 26 are treated prior to assembly with plastic prism 14a. It is understood that the glass plates will be thoroughly cleaned and dried in preparation for application of the mirror means and will also be cleaned in preparation for assembly on opposite sides of plastic prism 14a. The plastic prism should also be clean, free of dirt and dry. Since the plastic prism is frosted, care must be exercised to prevent marking the frosted surfaces. However, when the glass plates are disposed on opposite faces of the plastic prism, suitable steps must be taken for eliminating air between the opposite surfaces and also for heating the glass and plastic to a suitable temperature for hot pressing the glass and plastic to form a unitary assembly.

As a rule, the components of an entire mirror assembly (glass plates and plastic prism) are heated to about 300° to 400° F., in the case of polyvinyl butyral and for conventional automobile mirrors, the heating time may be about 10 minutes. Thus, in practice the entire mirror assembly may have a length of 10 or 12 inches at the most and a width of about between 2 and 3 inches. The plastic prism at its thickest (side 17) may be about ⅛ inch and may have glass plates on opposite sides thereof having a thickness of the order of about ⅟₁₆ inch. The thinnest side of plastic prism corresponding to 18 may be of the order of about .015 inch or preferably about .030 inch. It is understood that the actual dimensions of sides 17 and 18 of the plastic prism will depend upon the width of the mirror (the distance between sides 17 and 18) and the angle between faces 16 and 17. The dimensions given above are exemplary of a mirror having a width of about 2 inches and an angle of about 3 or 3½ degrees between planar faces 15 and 16.

It is evident that the heating time for a plastic prism and glass members carrying mirror surfaces will depend in some measure upon the thickness of material to be heated. The prism and glass members should all be similarly dimensioned insofar as length and width are concerned so that there will be no individual projecting portions from plastic or glass. The technique of permanently joining the glass and plastic involves rolling and pressing the assembly while hot to eliminate air bubbles, the pressure being sufficient to accomplish this (about 150 pounds per square inch for polyvinyl butyral) without causing the plastic to flow.

If prism angle tolerances are close, it is desirable to continue the mirror bonding procedure with the mirror components disposed in clamp 30 prior to having such mirror components disposed in processing pressure tank 31. Clamp 30 has unequal sides between which the mirror package is disposed. Cover 32 bolted at 33 is at the desired prism angle so that the mirror components can be tightly clamped to the desired angle. Prior to disposing the clamped assembly into tank 31, bolts 33 are tightened to compress the mirror components to a somewhat greater pressure than used in rolling. The increase in pressure need not be great.

It is also possible to put the mirror package, after rolling, directly into tank 31 without clamps.

Tank 31 may be filled with oil and heated to about 300° F. (this is preferably less than the preheat temperature). Then the pressure in tank 31 is raised to about 300 pounds per square inch and held for a number of minutes (about 7 for the mirror size previously given). Instead of oil, air may be used. By the time the tank pressure has been raised, the bonding will have been sufficient to seal the edges against ingress of oil or air.

After the tank pressure is reduced to atmosphere, the mirror assembly, in a clamp if used, is removed from the tank and allowed to cool to room temperature. Thereafter, the mirror assembly by itself is washed clean. If necessary, the edges of the assembly are ground smooth, then washed again and the mirror is now complete.

The frosted surfaces of plastic prism 14a permit excellent adhesion of the glass members to the plastic and provide microscopic paths for air to escape from between the surface of the assembly. This is true even where a glass member such as 26 carries a metallic reflecting coating on the face adjacent the plastic.

If other plastic materials are used, then it is possible to use thin transparent cement for adhesion between the parts of the assembly. A compact strong mirror package is thus provided.

Instead of having separate glass members carrying mirror surfaces, it is possible to apply the front and rear mirror surfaces directly to the plastic prism as illustrated in the modified construction using prism 14A. Front surface 25a′ may be of chrome or any other desirable metal and may be applied directly to the plastic prism by conventional sputtering or thermal evaporation in a high vacuum or by chemical deposition. Similar procedure may be used for obtaining rear reflecting surface 26a. Such a structure does not require the rolling and heating procedure previously referred to.

The frosted or roughened nature of the prism surfaces at faces 15 and 16 of the prism promote excellent adhesion in all cases where glass or mirror surfaces are to be applied to the plastic prism. The fact that such surfaces are frosted does not detract from the proper functioning of the mirror even though the planes of such frosted surfaces are non-parallel.

When rolling the plastic during initial formation of the prism shape or when rolling the plastic prism with glass on one or both sides, it is understood that rollers operating on nonparallel axes properly spaced from each other will be used. This will insure a proper prism angle and proper thickness dimensions of the plastic prism. The clear glass has uniform thickness (the two glasses need not necessarily have the same thickness) so that rolling can only affect the plastic material.

I claim:

1. A composite safety rear view mirror comprising an extruded or hot rolled wedge of transparent substantially colorless, optically uniform thermoplastic material having opposite angularly disposed planar faces defining an included angle of from 2° to 10° therebetween; a first, essentially transparent, somewhat reflective piece of glass bonded to one face of said wedge; and a second piece of glass bonded to the other face of said wedge and having a highly reflective surface, said wedge retaining said first and second pieces of glass at said included angle of from 2° to 10°, the bonded interfaces between said wedge and said pieces of glass being free of air bubbles, the reflective surface of said second piece of glass being viewable through said first glass piece and said wedge without undue optical or color distortion.

2. The composite safety rear view mirror of claim 1 in which said plastic planar faces have their surfaces roughened or frosted.

3. A composite safety rear view mirror comprising an extruded or hot rolled wedge of transparent substantially colorless, optically uniform thermoplastic material having opposite angularly disposed planar faces defining an included angle of from 2° to 10° therebetween; a first, essentially transparent, somewhat reflective piece of glass bonded to one face of said wedge; and a second piece of glass bonded to the other face of said wedge and having a highly reflective surface secured to said other face of said wedge in full flatwise, sealed engagement therewith, said wedge retaining said first and second pieces of glass at said included angle of from 2° to 10°, the bonded interfaces between said wedge and said pieces of glass being free of air bubbles, the reflective surface of said second piece of glass being viewable through said first glass piece and said wedge without undue optical or color distortion, said reflective surface of said second piece of glass being shielded by said wedge from the ambient atmosphere, the hands of the user, or the like.

4. The composite safety rear view mirror of claim 3 in which said plastic planar faces have their surfaces roughened or frosted.

5. A composite safety rear view mirror comprising a wedge of transparent, substantially colorless, optically uniform, thermoplastic material having opposite, planar, angularly disposed faces defining an included angle of from 2° to 10° therebetween, said plastic planar faces having their surfaces roughened or frosted; a first, essentially transparent, somewhat reflective piece of glass thermally bonded to one face of said wedge; and a second piece of glass thermally bonded to the other face of said wedge and having a highly reflective surface, said wedge retaining said first and second pieces of glass at said included angle of from 2° to 10°, and the reflective surface of said second piece of glass being viewable through said first glass piece and said wedge without undue optical or color distortion, said frosted plastic surfaces promoting escape of air during assembly and excellent adhesion to metallic optical members.

6. A composite safety rear view mirror comprising a wedge of transparent, substantially colorless, optically uniform thermoplastic material having opposite angularly disposed planar faces defining an included angle of from 2° to 10° therebetween, said plastic planar faces having their surfaces roughened or frosted; a first, essentially transparent, somewhat reflective piece of glass thermally bonded to one face of said wedge; and a second piece of glass thermally bonded to the other face of said wedge and having a highly reflective surface secured to said other face of said wedge in full flatwise, sealed engagement therewith, said wedge retaining said first and second pieces of glass at said included angle of from 2° to 10°, the reflective surface of said second piece of glass being viewable through said first glass piece and said wedge without undue optical or color distortion, said frosted plastic surfaces promoting escape of air during assembly and excellent adhesion to optical members, and said reflective surface of said second piece of glass being shielded by said wedge from the ambient atmosphere, the hands of the user or the like.

References Cited

UNITED STATES PATENTS

| | | | |
|---|---|---|---|
| 2,275,602 | 3/1942 | Beck et al. | 350—188 |
| 2,397,947 | 4/1946 | Colbert | 350—281 |
| 2,588,792 | 3/1952 | Barkley | 350—281 |
| 2,661,177 | 12/1953 | Hofer | 350—281 X |
| 2,876,676 | 3/1959 | Morgan | 350—281 |
| 2,964,999 | 12/1960 | Mazur | 350—281 |
| 3,004,473 | 10/1961 | Arthur et al. | 350—281 |
| 3,288,666 | 11/1966 | Dacey | 161—5 |
| 3,354,025 | 11/1967 | Aykanian | 156—100 |

PAUL R. GILLIAM, Primary Examiner